US012187582B2

(12) United States Patent
Nosyrev

(10) Patent No.: US 12,187,582 B2
(45) Date of Patent: Jan. 7, 2025

(54) DEVICE FOR CONTROLLING A CONTAINER, PARTICULARLY A BOTTOM-UNLOADING CONTAINER

(71) Applicant: Sergey Vasil'evich Nosyrev, Saint-Petersburg (RU)

(72) Inventor: Sergey Vasil'evich Nosyrev, Saint-Petersburg (RU)

( * ) Notice: Subject to any disclaimer, the term of this patent is extended or adjusted under 35 U.S.C. 154(b) by 670 days.

(21) Appl. No.: 17/599,632

(22) PCT Filed: Apr. 10, 2019

(86) PCT No.: PCT/RU2019/000234
§ 371 (c)(1),
(2) Date: Sep. 29, 2021

(87) PCT Pub. No.: WO2020/005104
PCT Pub. Date: Jan. 2, 2020

(65) Prior Publication Data

US 2022/0194746 A1 Jun. 23, 2022

(51) Int. Cl.
*B66C 1/10* (2006.01)
*B66C 1/22* (2006.01)

(52) U.S. Cl.
CPC .............. *B66C 1/101* (2013.01); *B66C 1/223* (2013.01)

(58) Field of Classification Search
CPC ......... B66C 1/101; B66C 1/223; B66C 1/663; B66C 1/66; B66C 16/00
(Continued)

(56) References Cited

U.S. PATENT DOCUMENTS 3,789,998 A * 2/1974 Fathauer ................. B66C 1/101 294/81.4
4,215,892 A * 8/1980 Holmes ................... B66C 1/663 294/81.53
(Continued)

FOREIGN PATENT DOCUMENTS

AU 2017201522 A1 10/2017
RU 2667206 C1 9/2018
(Continued)

OTHER PUBLICATIONS

International Search Report for International Application No. PCT/RU2019/000234 mailed Jan. 2, 2020.
(Continued)

*Primary Examiner* — Paul T Chin
(74) *Attorney, Agent, or Firm* — Perilla Knox & Hildebrandt LLP; Kenneth A. Knox

(57) ABSTRACT

Controlling a container, such as a spreader, is described for engaging, retaining, and moving containers, as well as for unloading containers, particularly bottom-unloading containers. A spreader includes a frame having mounted thereon twistlocks, an actuator, a movable engagement mechanism, and force transmission means connecting the actuator and the movable engagement mechanism. The actuator and the force transmission means are substantially disposed along the long sides of the frame, and the movable engagement mechanism is substantially disposed on the short sides of the frame. The actuator allows the movable engagement mechanism to move reciprocally primarily in a direction perpendicular to the plane of the frame. The spreader significantly expands the functionality of devices used for engaging, retaining, moving, and unloading containers, makes it possible to unload a bottom-unloading container, and also
(Continued)

allows the automation, simplification, and acceleration of the unloading process of such a container.

20 Claims, 5 Drawing Sheets

(58) Field of Classification Search
USPC .............................................. 294/81.1, 81.53
See application file for complete search history.

(56) References Cited

U.S. PATENT DOCUMENTS

| | | | | |
|---|---|---|---|---|
| 4,488,749 | A * | 12/1984 | Voelz | B66C 1/663 294/81.21 |
| 5,630,635 | A | 5/1997 | Karlsson | |
| 6,920,963 | B2 * | 7/2005 | Faller | B66F 11/04 212/312 |
| 7,152,895 | B1 * | 12/2006 | Jussila | B66C 1/663 294/81.53 |
| 8,226,137 | B2 * | 7/2012 | Kasper | B66C 11/06 254/358 |
| 8,840,159 | B2 * | 9/2014 | Karlsson | B66C 1/102 294/81.53 |
| 10,968,081 | B2 * | 4/2021 | Karlsson | B66C 1/66 |

FOREIGN PATENT DOCUMENTS

| | | | |
|---|---|---|---|
| RU | 2673991 | C1 | 12/2018 |
| RU | 2681233 | C1 | 3/2019 |
| WO | 2013006141 | A1 | 1/2013 |
| WO | 2017196260 | A1 | 11/2017 |

OTHER PUBLICATIONS

Written Opinion for International Application No. PCT/RU2019/000234 mailed Jan. 2, 2020.

* cited by examiner

DEVICE FOR CONTROLLING A CONTAINER, PARTICULARLY A BOTTOM-UNLOADING CONTAINER

CROSS-REFERENCE TO RELATED APPLICATION

This application is a national phase application under 35 U.S.C. § 371 of International Application No. PCT/RU2019/000234 filed Apr. 10, 2020, the contents of which being incorporated by reference in their entireties herein.

TECHNICAL FIELD

This disclosure relates to cargo-handling equipment and, in particular, to devices for controlling containers, such as spreaders, and is intended for engaging, holding, and moving containers, as well as for unloading containers shipping bulk cargoes, in particular, bottom-dump containers (bottom discharge containers).

BACKGROUND

Devices for engaging and moving containers, including large-capacity ISO containers, are known, which are called spreaders. Spreaders may allow performing additional operations, such as opening the lid (hatch) of a container for providing access to its contents and dumping a container by rotating it around the horizontal axis going substantially in parallel to the long side of the container, or by tilting a container.

Thus, International Application WO2013006141 describes a spreader performing engagement and movement of a container, additionally comprising a lid engagement device, comprising, in its turn, twistlocks and mechanisms for vertical movement of said twistlocks. The twistlocks engage with the corresponding castings on the lid located on the container top, and subsequent vertical movement of the twistlocks in their upper position enables to lift the lid. This spreader does not rotate a container; this function is performed by another device, or a container may be unloaded by gripping its contents with another additional devices. It is evident that a speed of unloading such a container is low and, moreover, unloading requires use of additional devices and, correspondingly, additional space.

Applications AU2017201522, WO2017196260 describe spreaders that, in addition to engagement and lifting of a lid located on the container top, also perform rotation of a container, which allows unloading a container quicker. For this purpose the known spreaders comprise mechanisms for rotating a container around the horizontal axis substantially parallel to the long side of a container. Such a spreader may speed up unloading a container and does not require a use of additional devices or manual operations.

Patent RU2667206 describes a spreader performing, in addition to engagement and holding of a container, unloading it by tilting a container around the horizontal axis substantially parallel to the container short side and dumping a cargo through a hatch (door) located at one end of the container. In conventional spreaders of this type the operations of unlocking and locking the hatch (door) are performed manually, rather than by means of spreader mechanisms, which slows down an operating speed.

The known technical solutions used for unloading and implemented in conventional spreaders, including those described above, have the following essential drawbacks.

First of all, more severe requirements to the rigidity and durability of the spreader structure are applied, its design becomes more complicated, since additional strengthening members and members providing holding of a container in a partially or fully turned (tilted) position are required. The use of the engaging and holding mechanisms (twistlocks), that are standard for the container industry, is also non-obvious, since they all are designed for loads acting along the longitudinal axis of the twistlock and are not designed for bending (breaking) loads.

Also, more severe requirements to rigidity and durability of the container structure are applied. The requirements of the International Convention for Safe Containers (CSC) (Geneva, 2 Dec. 1972) and the corresponding ISO standards do not contain norms as well as methods for testing container fittings and frames for loads acting when a container is tilted or rotated. This may lead to the necessity of labor-consuming and long development and approval of such norms and test methods, or, if they are unavailable, to restrictions on the use of such containers.

Further, there are no all-purpose spreaders that may be used for handling containers of different sizes and with different center-of-gravity position of a cargo. If the container height is changed, and/or a cargo with a different bulk density and, correspondingly, a different center-of-gravity position in containers is handled, it is frequently required to provide and apply a different spreader.

Another disadvantage of conventional spreaders is their limited functionality when handling new containers which are unloaded through the bottom, rather than through an upper lid or a hatch (door) at one end. One example of such a new container is the container according to Patent RU 2673991. Its specific feature is that the openable and fixable hatches (doors) for dumping a cargo (or bottom discharge) are arranged in the lower part of the container body. If conventional spreaders are used, unlocking, opening, closing and locking the doors located in the lower part of a container will require either additional equipment, or, which is more likely currently the use of workforce, which involves known difficulties.

So, there exists the task to provide a spreader capable of handling said bottom-dump containers and not only engaging, holding and moving bottom-dump containers, but also manipulate hatches of such containers, namely to ensure unlocking, opening, closing and locking hatches. In this sense, the spreader according to this disclosure may be also called as a device for controlling a container, since it provides performance of additional functions that are usually not characteristic of the spreaders known in the art. Within the framework of the present application, the terms "spreader" and "device for controlling a container" should be considered as equivalent.

BRIEF SUMMARY

The present disclosure is aimed at eliminating disadvantages of conventional spreaders and developing a device for controlling a container, which enables to engage, hold and move containers as well as manipulate hatches (doors) of bottom-dump containers, including manipulation in the fully automated mode, by using only the mechanisms of this device, hereinafter also referred to as "spreader".

The described spreader performs at least the following main functions:

- engaging and holding any container, including a standard ISO container, for example 20-feet container, to move it;

controlling hatches (doors) of bottom-dump containers. In general, the following operations may be performed with the hatches of a bottom-dump container: unlocking, opening, closing, locking the hatches. The hatches are set in motion by means of drawbars; one end of the drawbars is attached to the hatch, and the other end of the drawbars is brought out to the upper part of the container and may be connected, by means of a connector suitable for this purpose (in particular, a standard container fitting), to the actuator arranged in the spreader for performing these operations.

These functions may be performed by the described spreader in cases of wide-range changes in container heights, hatch sizes and shapes, cargo characteristics, cargo distribution in a container, etc.

In order to unlock, open, close and lock the hatches, they are moved by acting on the drawbars; a movement distance may be significant and may exceed 1.7 meters. In the course of the common approach, i.e. when the actuators are arranged vertically along the lateral sides of the spreader, the latter will be rather high, up to 2 meters and more, which is undesirable for many reasons.

Thus, another task to be solved by this disclosure is to provide a compact structure of the proposed spreader, first of all in its height.

At last, one more capability provided for in the structure of the described spreader is the possibility of operating two spreaders simultaneously by hanging them on a special transverse beam, which will increase work efficiency twice. The spreader structure does not hinder it in any way owing to the arrangement of its structural members and the corresponding selection of the structural members used in the described spreader.

The technical effects of this disclosure are: expansion of the range of engineering tools used for engaging, holding and moving containers as well as controlling containers for unloading them; the provision of the possibility of unloading bottom-dump containers; automation, simplification and acceleration of the process of unloading such containers.

The set tasks are solved and the stated technical effects are achieved by the device for controlling a container, or the spreader, comprising a frame with standard means of engaging a container mounted thereon, e.g. twistlocks used for engaging and holding a container, an actuator, a movable engagement mechanism with additional engagement means, and force transmission means connecting the actuator and the movable engagement mechanism. The actuator and the force transmission means may be disposed substantially along the long sides of the frame, and the movable engagement mechanism is disposed substantially on the short sides of the frame. Here, the actuator is configured to impart reciprocating motion to the movable engagement mechanism mainly in the direction perpendicular to the frame plane, i.e. in the vertical direction, including going beyond the dimensions (contour, lower plane of the frame) of the spreader.

The described device for controlling a container may be used with any conventional containers and is intended, inter alia, for automated control of a bottom-dump container, in particular, described in Patent RU 2673991.

With regard to holding and moving the container, the spreader does not differ from most analogous solutions and comprises a load frame with twistlocks arranged thereon, their actuator means (hydraulic or electric), as well as an appropriate device for controlling, signaling and communicating with the operator.

With regard to manipulating hatches of the container, the spreader is provided, first of all, with a special device for manipulating the hatches of the container for capturing and holding the hatch controlling drawbars. This device—a movable engagement mechanism—comprises an additional engagement means (for example, a twistlock) for connecting to the drawbars of the hatches of the container and can move relative to the spreader in a plane parallel to the end walls of the container to a distance exceeding the height of the spreader, for which purpose the movable engagement mechanism is secured to the actuator through a flexible load connection (a cable, a chain).

The actuator can be realized as an electric motor and a hydraulic drive, if necessary—with a gearbox. The actuator may be located directly above the movable engagement mechanism in the end frame of the spreader or in the middle part of the spreader. The actuator is connected via a force transmission device (e.g., a rotary block) to a linear power mechanism (e.g., a hydraulic cylinder) located closer to the middle part of the spreader, from which a force is transmitted to a cable (or a chain) connected to the movable engagement mechanism.

Through the use of force transmission means that convert the reciprocating motion provided by the actuator mainly in the horizontal plane (the frame plane parallel to the long side of the container) into the reciprocating motion of the movable engagement mechanism mainly in the vertical plane (perpendicular to the frame plane, perpendicular to the long side of the container), it becomes possible to achieve a small height of the described spreader and also, without using additional devices, ensure transmission of the force required for manipulating hatches of a bottom-dump container, including cases when the hatches are under a high load. Apparently, the additional provision of the spreader with an actuator, force transmission means and a movable engagement mechanism enables to fully automate the process of controlling a bottom-dump container, eliminate the need of using workforce, and, as a result, accelerate the process of dumping such a container.

Further, the set tasks are solved and the stated technical effects are achieved in various embodiments of the device for controlling a container, according to which:

- the spreader contains fittings disposed on the frame for installing or suspending the spreader on crane equipment, either directly or through an intermediate frame (traverse beam);
- the actuator is a hydraulic drive and comprises at least one hydraulic cylinder, while the hydraulic drive may be located substantially in the middle part of the frame;
- the spreader further comprises a control unit for controlling the actuator and/or the twistlocks for mounting into container fittings;
- the control unit comprises a pressure generating device for a hydraulic actuator. Alternatively, the control unit may comprise means of supplying pressure for the hydraulic drive, for example, from crane equipment;
- the force transmission means may be a cable-block mechanism, and the cable-block mechanism comprises a pulley block;
- the movable engagement mechanism comprises a rotary mechanism, and the additional engagement means are a twistlock engaging with the mating part of a container.

Below, the disclosure and its advantages over known analogous solutions will be described in detail with reference to the accompanying drawings.

DETAILED DESCRIPTION

Figure 1:
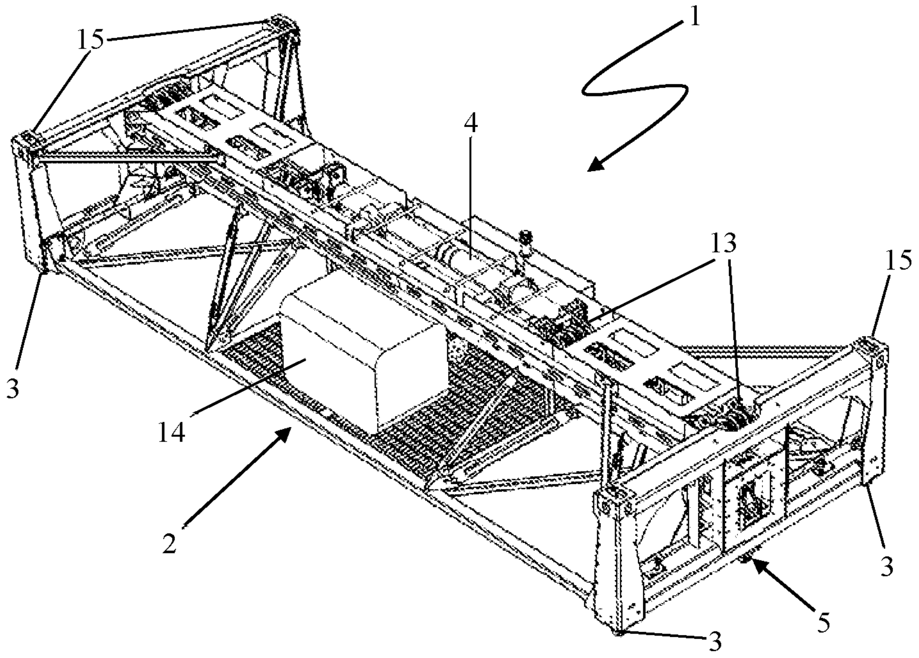
FIG. 1 shows the device for controlling a container.
Figure 2:
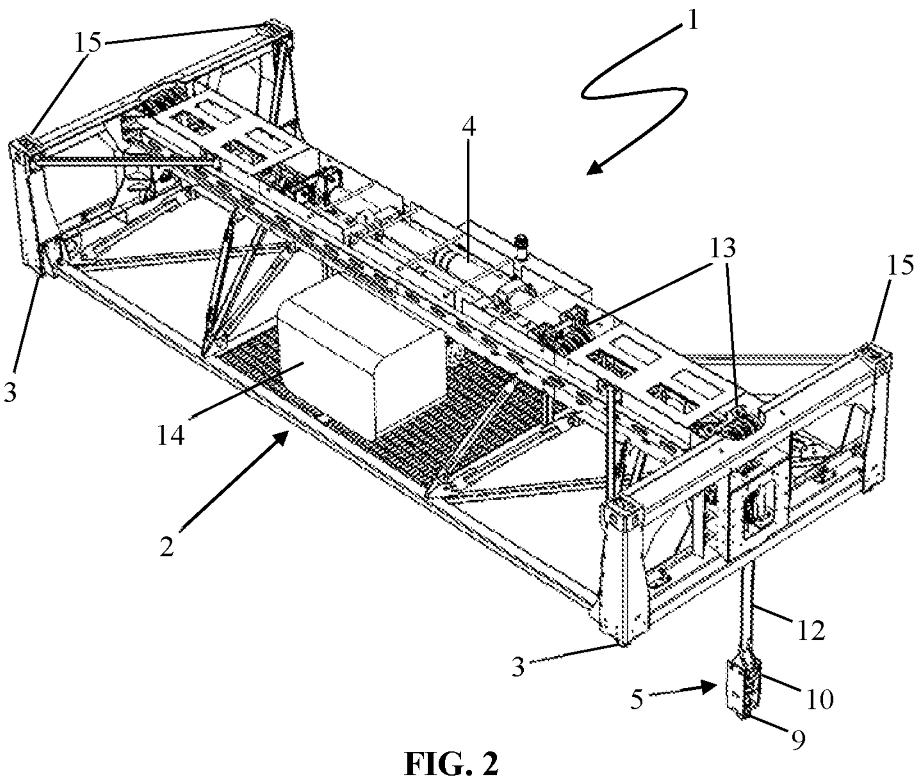
FIG. 2 shows the device for controlling a container with the extended movable engagement mechanism.

The described device for controlling a container, or spreader 1, is schematically shown in FIGS. 1, 2 and comprises a frame 2 with twistlocks 3 mounted on it, an actuator 4, a movable engagement mechanism 5 and force transmission means connecting the actuator 4 and the movable engagement mechanism 5.

Figure 3:
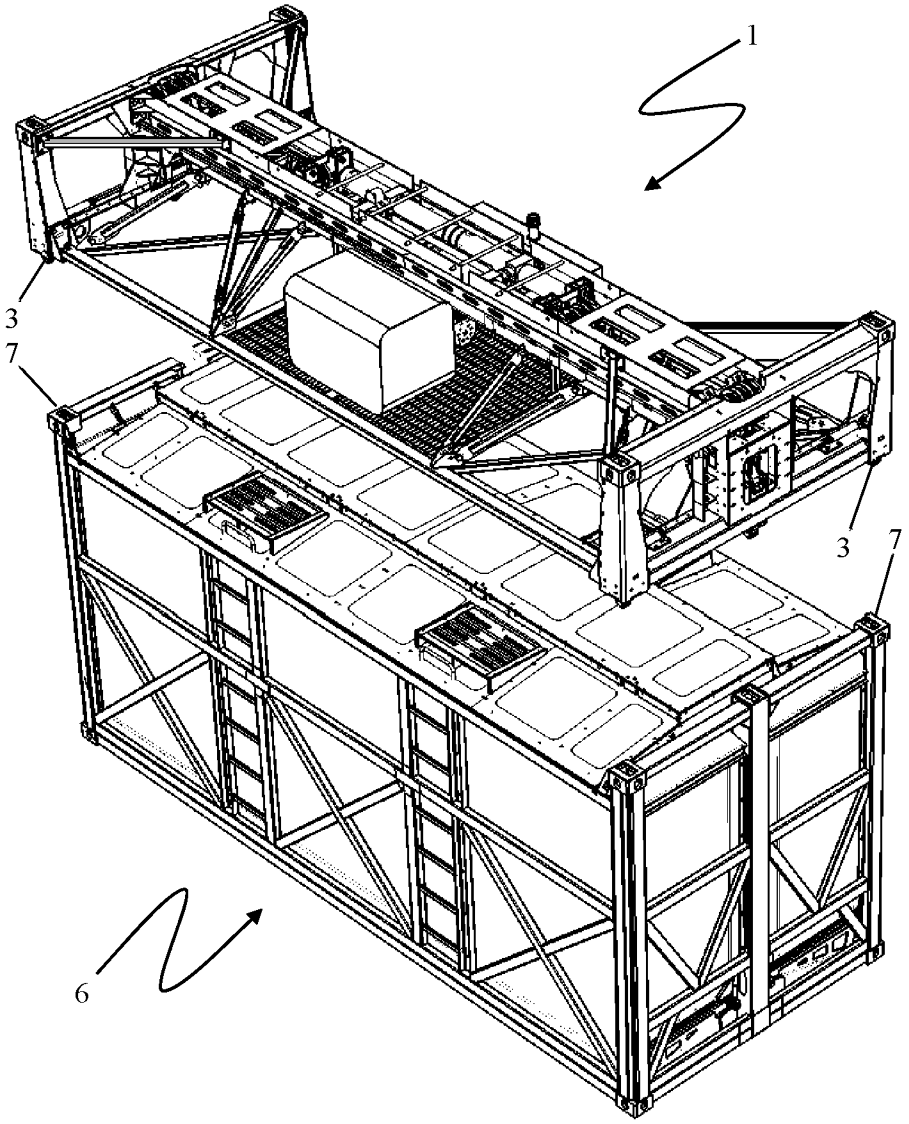
FIG. 3 schematically shows mounting of the device for controlling a container onto a container.

Like in conventional spreaders and other means of moving containers, the twistlocks 3 are used to engage and hold a container 6, entering into corresponding fittings 7 of the container, which are located on the top of the container 6 (FIG. 3). For the convenience of matching the twistlocks 3 with the fittings 7 of the container, rails (not shown in the drawings) may be additionally installed on the frame 2.

The actuator 4 is intended for moving the movable engagement mechanism 5 and, correspondingly, manipulating the hatches of the container 6, as will be described below. The actuator 4 may be any known actuator, for example, electric, magnetic, hydraulic, etc. Taking into account high requirements to container-handling devices, such as provided power and reliability, the actuator 4 can be realized as a hydraulic drive. In such a case, the actuator 4 may comprise one or more hydraulic cylinders, depending on power that it must provide and overall dimensions of containers which are controlled by the described spreader 1.

The actuator 4 is located substantially along (parallel, or close to parallel, to) the long sides of the frame 2, as shown in FIGS. 1, 2, and, respectively, along the long sides of the container 1, or horizontally. First, it ensures a compact design of the described device for controlling a container. Second, such arrangement of the actuator 4 enables to make it larger than if the actuator 4 was located, for example, vertically on the end sides of the spreader 1. And the large size of the actuator 4 also means higher power it can provide, thus increasing its reliability. In addition, it is reasonable to arrange the actuator 4 substantially in the middle part of the frame 2, as shown in FIGS. 1, 2, to ensure the best balance of the spreader 1 and sufficient space to accommodate the force transmission means on the frame 2.

Figure 5:
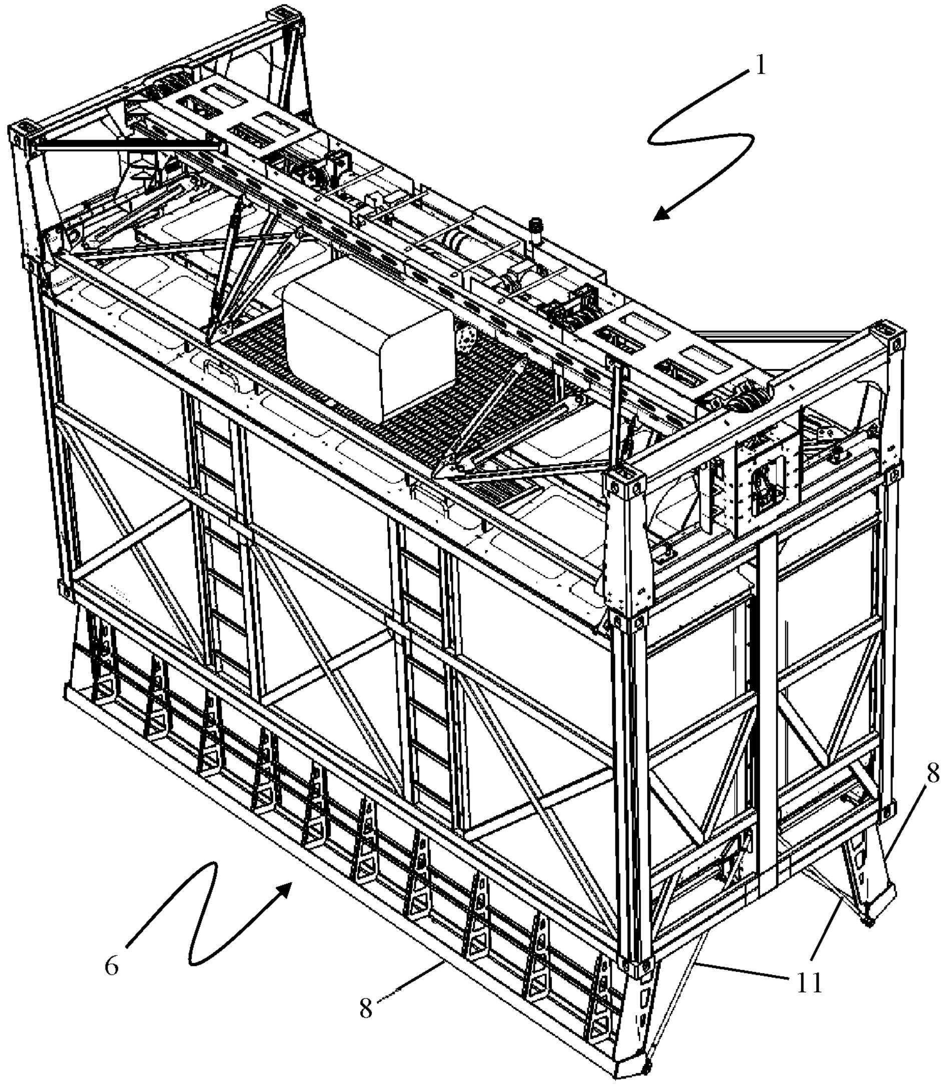
FIG. 5 schematically shows controlling hatches of a container with the use of the device for controlling a container.

The movable engagement mechanism 5 is configured to engage with the corresponding means for controlling hatches that control the positions of the hatches 8 of the container 6 (FIG. 5). For this purpose, the movable engagement mechanism 5 may comprise, for example, an additional twistlock 9 and a rotary mechanism 10 (FIG. 2) for rotating the additional twistlock 9 when the additional twistlock 9 matches the means for controlling the hatches 8 for interlocking the additional twistlock 9 with the means for controlling the hatches 8.

These means for controlling the hatches 8 may be drawbars 11 which first ends are connected to the corresponding hatch 8, and the second ends engage the movable engagement mechanism 5. Such engagement can be made, for example, by means of an additional twistlock 9 and a mating fitting (not shown in the drawings) located at the second ends of the drawbars 11.

The movable engagement mechanism 5 is located on the short, or end, sides of the frame 2. This enables to arrange it as close as possible to means for controlling the hatches of the container 6.

Since the movement directions of the actuator 4 and the movable engagement mechanism 5 are substantially mutually perpendicular, the force transmission means connecting the actuator 4 and the movable engagement mechanism 5 should ensure a change in the direction of force application. For this, the force transmission means may be realized by any method known to a person skilled in the art, for example, be a cable-block mechanism.

As an example, FIG. 1 shows an embodiment of the force transmission means in the form of a cable-block mechanism, comprising at least cables 12 (or chains, or other suitable means) and roller mechanisms 13 (or blocks). At one end, the cables 12 are connected to the actuator 4 and at the other end to the movable engagement mechanism 5; and the roller mechanisms 13 are used for said change in the movement direction. Further, especially when working with a large, heavily loaded container 6, the cable-block mechanism may also comprise a pulley block (not shown in the drawings), which allows either to increase a transmitted force, or, to increase the run of the movable engagement mechanism 5 (when a return pulley block is used).

Thus, according to various embodiments of the present disclosure, the movable engagement mechanism 5 moves substantially in a vertical direction perpendicular to the plane of the frame 2, engages the mating means of controlling the hatches and transmits force from the actuator 4 to the hatches 8 of the container 6. For the convenience of viewing, FIG. 2 shows the movable engagement mechanism 5 in the extended position, extending beyond the boundary of the lower plane of the frame 2. This position of the movable engagement mechanism 5 may correspond to the maximum opening of the hatches 8. It is clear that the movable engagement mechanism 5 may also rise above the lower plane of the frame 2, as shown in FIG. 1, for example, when closing the hatches 8.

Further, the force transmission means may ensure transmission of not only reciprocating motion from the actuator 4 to the movable engagement mechanism 5, but also forces to the rotary mechanism 10 to provide rotational movement of the additional twistlock 9 for engagement with the mating fitting at the second ends of the drawbars 11. Alternatively, the rotary mechanism 10 may itself be a drive ensuring rotational movement of the twistlock 9. In any case, this enables to fully automate the process of manipulating the hatches 8 of the container 6.

The frame 2 may additionally accommodate a control unit 14 for the actuator 4 and for the drives of the twistlocks 3 for engaging and holding the container 6. In particular, if the actuator 4 is electric or magnetic, the control unit 14 may be an electric generator or, for example, a distribution panel to which external power is supplied. If the actuator 4 is hydraulic, the control unit 14 may comprise a pressure generating device for the hydraulic actuator or may simply comprise means of supplying pressure for the hydraulic actuator from the outside, for example, from an external compressor. Furthermore, the control unit 14 itself or another additional device may comprise electronic systems for monitoring, troubleshooting, controlling the spreader 1, communicating with the operator or other external equipment.

Similarly to the actuator 4, it is desirable that the force transmission means are located substantially along (in parallel to or close to a parallel position) the long sides of the frame 2 and, accordingly, along the long sides of the container 6, or horizontally. This ensures the compactness of the spreader 1, and also enables to transmit high power (force) to the hatches 8 and ensures reliability of the described device for controlling a container.

The described device for controlling a container may be suspended by any known method directly on a crane or other conventional device for lifting and moving cargoes, for example, via additional twistlocks 15.

The described device for controlling a container is operated as follows.

The spreader 1 is suspended (mounted) on a crane or other conventional device for lifting and moving cargoes, for example, by the frame 2 or additional twistlocks 15.

Figure 4:
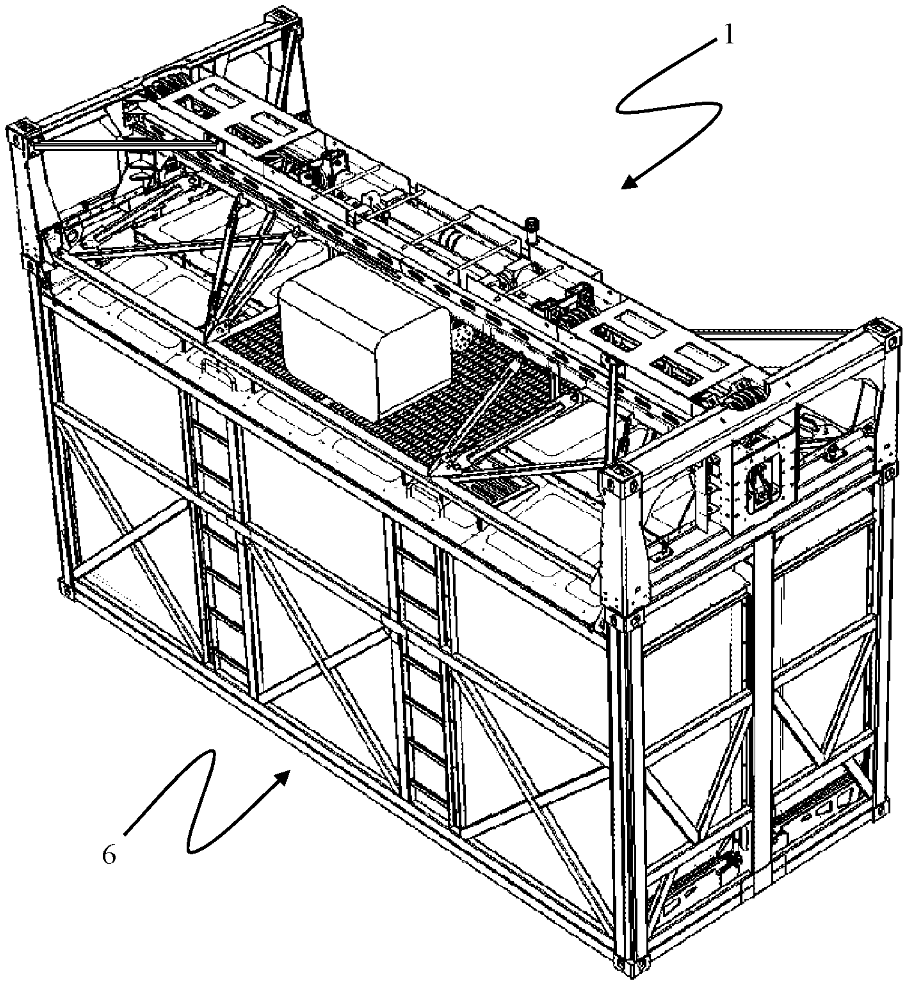
FIG. 4 shows a device for controlling a container mounted on a container.

Then, the spreader 1 is moved to a container 6 (FIG. 3) and lowered onto the container 6 (FIG. 4). The twistlocks 3 engage the fittings 7 on the top of the container 6, and their engagement is locked by, for example, turning the twistlocks 3 by means of the rotary mechanism 10.

After locking the engagement between the twistlocks 3 and the fittings 7, a crane or a device for lifting and moving cargoes can move the spreader 1 and the container 6 attached thereto.

To open and close the hatches 8 of the container 6, when, for example, dumping the container 6, the movable engagement mechanism 5 is moved, by using the actuator 4 and the force transmission means, to the mating hatch controls and brings them into mutual engagement. A further movement of the movable engagement mechanism 5 causes movement of the mating hatch controls and, correspondingly, the hatches 8 as such.

For example, the movable engagement mechanism 5 comprises the rotary mechanism 10 and the additional twistlock 9, and the mating means for controlling hatches comprise a mating fitting (not shown in the drawings) and the drawbars 11 connecting the mating fitting and the hatches 8, as described above. The actuator 4 moves, by the force transmission means (comprising, for example, the cables 12 and the roller mechanisms 13), the movable engagement mechanism 5 to the mating fitting so that the additional twistlock 9 enters the mating fitting. Further, the rotary mechanism 10 rotates the additional twistlock 9 (for example, by a built-in drive, or by transmitting the corresponding force from the actuator 4, or it may be done manually), so that the additional twistlock 9 engages the mating fitting. Then, up or down movement of the movable engagement mechanism 5 causes the similar movement of the mating fitting and, through it, the corresponding up or down movement of the drawbars 11 that control the opening and closing the hatches 8.

It should be noted that for opening the hatches 8 either a simple unidirectional movement of the drawbars 11 down, or a more complex movement, for example, first a small shift of the drawbars 11 up and then a longer shift down, may be required. Such a two-stage movement of the drawbars 11 may be required, for example, when the hatches 8 should be slightly lifted to unlock them first, and only after the hatches 8 can be opened by moving the drawbars 11 down. Apparently, any algorithm for moving the movable engagement mechanism 5 that is required to unlock, open, close, and lock the hatches 8 can be implemented by using the actuator 4 and/or the control unit 14.

Moreover, by using the actuator 4 and/or the control unit 14 it is also possible to realize additional or service functions, such as cleaning the hatches 8 or the entire container 6, for example, by imparting a low-frequency oscillation to them, which can be easily realized by methods known to those skilled in the art when using the described device for controlling a container.

Thus, the described device for controlling a container enables to significantly expand the functionality of conventional spreaders used for engaging, holding, moving and unloading containers, ensures the possibility of unloading a bottom-dump container and provides automation, simplification and acceleration of the process of dumping such a container.

What is claimed is:

1. A device for controlling a bottom dump-container and controlling batches thereof, comprising:
- a frame having mounted thereon twistlocks, an actuator, a movable engagement mechanism having engagement means, and a force transmission means connecting the actuator and the movable engagement mechanism,
- the actuator and the force transmission means being substantially disposed along long sides of the frame,
- the movable engagement mechanism being substantially disposed on short sides of the frame, and
- the actuator being configured to allow the movable engagement mechanism to move reciprocally primarily in a direction perpendicular to a plane of the frame so as to engage the engagement means with respective means of the hatches and control the hatches.

2. The device for controlling the container according to claim 1, wherein the actuator is substantially disposed in a middle part of the frame.

3. The device for controlling the container according to claim 2, wherein the actuator is a hydraulic drive comprising at least one hydraulic cylinder.

4. The device for controlling the container according to claim 1, wherein the actuator is a hydraulic drive comprising at least one hydraulic cylinder.

5. The device for controlling the container according to claim 4, further comprising a pressure generating device for the hydraulic drive.

6. The device for controlling the container according to claim 4, further comprising a pressure supply means for the hydraulic drive.

7. The device for controlling the container according to claim 1, wherein the force transmission means are a cable-block mechanism.

8. The device for controlling the container according to claim 7, wherein the cable-block mechanism comprises a pulley block.

9. The device for controlling the container according to claim 1, wherein the movable engagement mechanism comprises a rotary mechanism and an additional twistlock engaging a mating part of the container.

10. The device for controlling the container according to claim 9, wherein the actuator and the force transfer means are configured to allow the additional twistlock to move rotatably.

11. A method for controlling a bottom-dump container and controlling hatches thereof, comprising:
- providing a device having a frame having twistlocks mounted thereon, an actuator, a movable engagement mechanism having engagement means, and a force transmission means connecting the actuator and the movable engagement mechanism, the actuator and the force transmission means being substantially disposed along long sides of the frame, the movable engagement mechanism being substantially disposed on short sides of the frame; and directing the actuator to allow the movable engagement mechanism to move reciprocally primarily in the direction perpendicular to a plane of the frame so as to engage the engagement means with respective means of the hatches and control the hatches.

12. The method for controlling the container according to claim 11, wherein the actuator is substantially disposed in a middle part of the frame.

13. The method for controlling the container according to claim 12, wherein the actuator is a hydraulic drive comprising at least one hydraulic cylinder.

14. The method for controlling the container according to claim 11, wherein the actuator is a hydraulic drive comprising at least one hydraulic cylinder.

15. The method for controlling the container according to claim 14, wherein the device further comprises a pressure generating device for the hydraulic drive.

16. The method for controlling the container according to claim 14, wherein the device further comprises a pressure supply means for the hydraulic drive.

17. The method for controlling the container according to claim 11, wherein the force transmission means are a cable-block mechanism.

18. The method for controlling the container according to claim 17, wherein the cable-block mechanism comprises a pulley block.

19. The method for controlling the container according to claim 11, wherein the movable engagement mechanism comprises a rotary mechanism and an additional twistlock engaging a mating part of the container.

20. The method for controlling the container according to claim 19, wherein the actuator and the force transfer means are configured to allow the additional twistlock to move rotatably.

* * * * *